April 30, 1957     A. W. ROSSOW     2,790,414
PORTABLE PET HOUSE
Filed Feb. 13, 1956     2 Sheets-Sheet 1
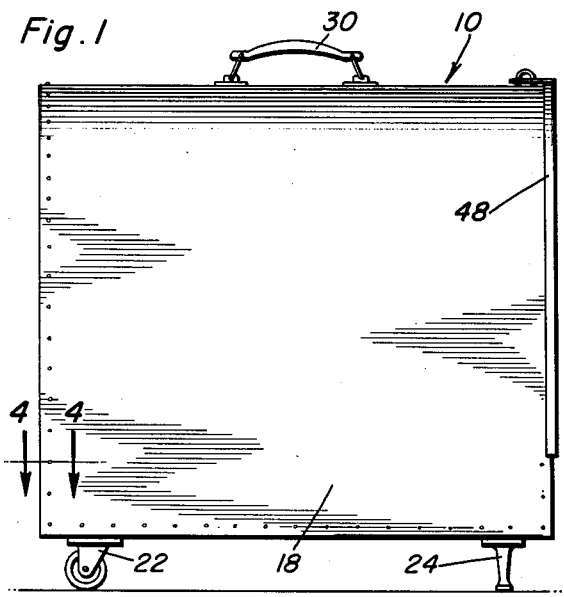
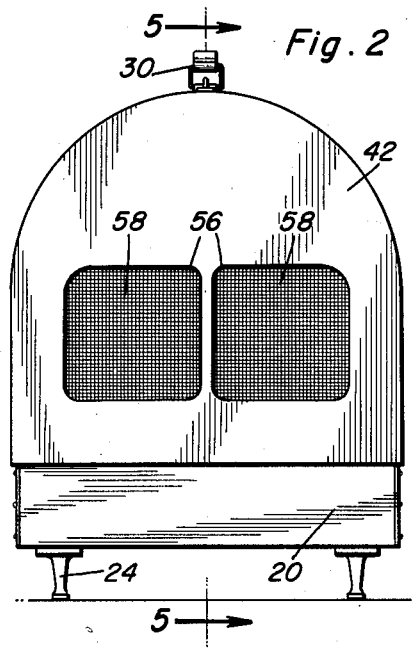
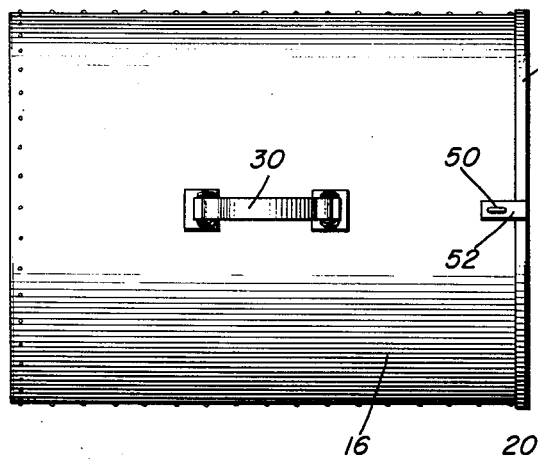
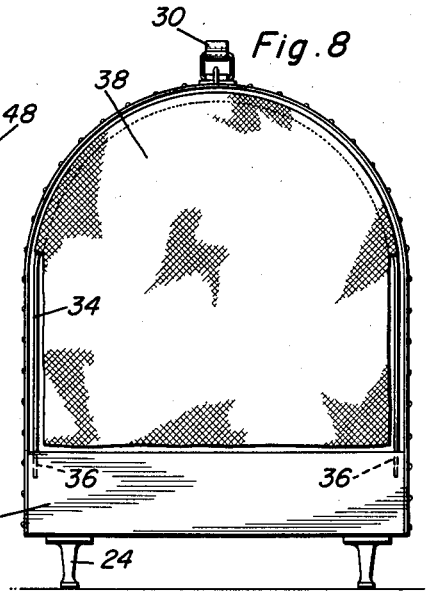
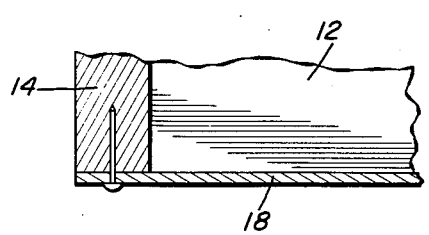
August W. Rossow
INVENTOR.

April 30, 1957     A. W. ROSSOW     2,790,414
PORTABLE PET HOUSE
Filed Feb. 13, 1956     2 Sheets-Sheet 2
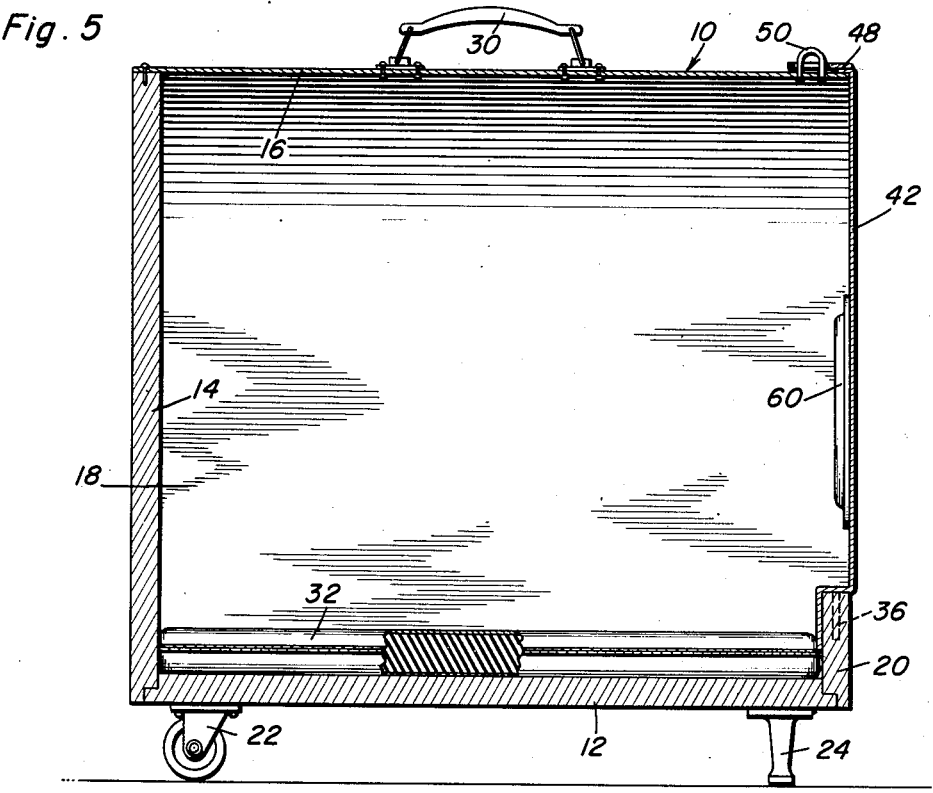
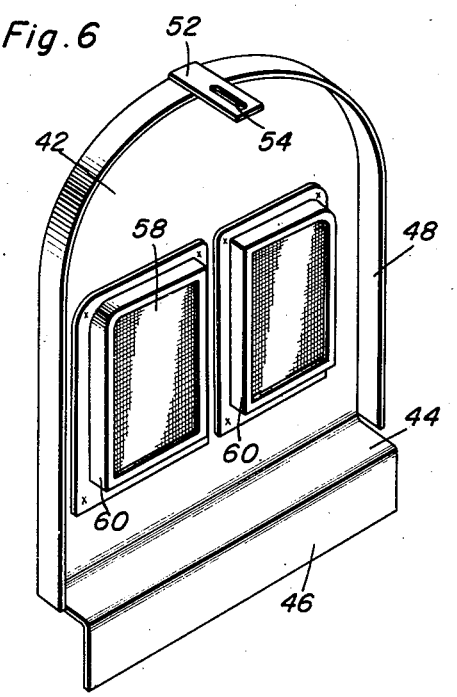
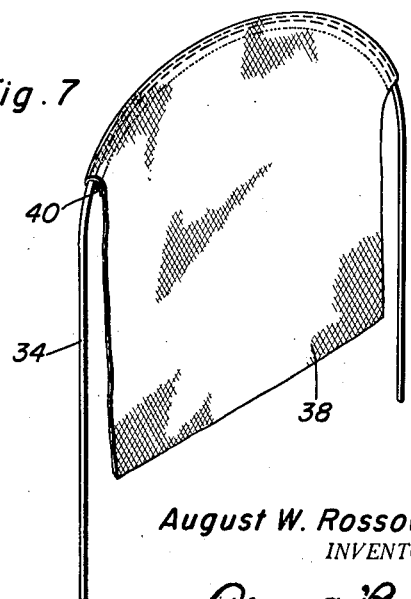
August W. Rossow
INVENTOR.

United States Patent Office 2,790,414
Patented Apr. 30, 1957

2,790,414

PORTABLE PET HOUSE

August W. Rossow, Cannon Beach, Oreg.

Application February 13, 1956, Serial No. 564,991

4 Claims. (Cl. 119—19)

This invention comprises novel and useful improvements in a portable pet house and more particularly relates to a cage for the convenient, safe and comfortable housing and transportation of pets.

The principal object of this invention is to provide a portable pet house by means of which pets and other animals may be hygienically, comfortably and safely housed and may be readily and easily transported.

A further object of the invention is to provide a portable pet house in accordance with the preceding object having an improved means for rendering the same portable, and especially to facilitate the carrying of the device by a handle in a level position, and to facilitate the resting of the same upon the floor in a level position and facilitating subsequent movements of the device over the floor.

A further object of the invention is to provide a portable pet house having an improved ventilating means therefor.

Still another object of the invention is to provide a portable pet house having a removable door panel incorporating ventilating means therein.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the portable pet house in accordance with this invention, the same being shown resting upon a horizontal supporting surface;

Figure 2 is an end elevational view of the device of Figure 1, taken from the door end of the same;

Figure 3 is a top plan view of the device;

Figure 4 is a horizontal sectional detailed view taken upon an enlarged scale substantially upon the plane indicated by the section line 4—4 of Figure 1;

Figure 5 is an enlarged vertical central longitudinal sectional view taken through the device, substantially upon the plane indicated by the section line 5—5 of Figure 2, a portion of the floor cushion of the device being broken away and shown in section;

Figure 6 is an enlarged perspective view of the removable door panel of the device, and looking at the inside face of the panel;

Figure 7 is an enlarged perspective view of a frame and curtain for closing the door opening when transportation of the device is not contemplated; and Figure 8 is an end elevational view similar to Figure 2 but showing the door panel removed and the curtain installed in lieu thereof.

In accordance with this invention, the portable pet house or portable cage for pets and other animals consists of a housing or receptacle indicated generally by the numeral 10 and which may be formed of any suitable material, and in any desired size and shape. The housing includes a bottom wall 12 which may conveniently be of wood, a rear end wall 14 which is secured to the bottom wall, and a single continuous panel forming a combined top 16 together with side walls 18. As will be apparent from Figures 1, 3 and 4, the combined top and side wall is secured at its edges to the two side edges of the bottom wall 12 and to the top and side edges of the end wall 14 by suitable fasteners.

At its other end from the end wall 14, at what may be termed its door end, the housing is provided with a transversely extending door sill 20. The door opening bounded by the top horizontal surface of the door sill and the adjacent edge of the combined top and side walls is provided with removable closure means as set forth hereinafter.

At what may be termed its forward end, there are provided suitable supporting caster wheels 22 attached to the underside of the floor 12 while supporting legs 24 are secured at the other end of the floor to the underside thereof. By this means, as indicated in Figure 5, the device may be rested in a level position upon a horizontal supporting surface, being supported upon the casters and legs.

In order to effect convenient transportation of the device, there is provided a handle 30 which is secured to the top wall at about its middle portion, and substantially upon the vertical axis of the center of gravity of the device, whereby the device may be carried in a level manner for transportation of a pet or the like.

Shown in Figure 5 at 32 is a cushioning pad which may consist of a foam rubber cushion and which may be snugly received within the housing to form a cushioning pad upon the floor of the same to thereby contribute to the comfort of the pet carried by the device.

A pair of closure members are provided which may be simultaneously or interchangeably and selectively employed to close the door opening of the housing during transportation or when the device is employed during periods of non-transportation.

Especially adapted for use during periods of non-transportation is a closure curtain consisting of a U-shaped wire frame 34 whose leg portions are adapted to be removably received in vertical bores 36 in the door sill 20, as shown in Figure 8, this wire frame substantially closing the door opening. A curtain 38 of any suitable material is seamed upon the wire frame as at 40 and serves to close the door opening but to permit passage of the pet therethrough if the closure panel or door panel is not in place. It is to be understood that the curtain may be of any suitable material and construction desired.

A rigid door panel 42 is provided for closing the door opening when the device is to be transported. This door panel which may be of metal or any other suitable material consists of a flat plate having at its lower end a horizontal flange 44 adapted to overlie and rest upon the top surface of the door sill 20, and depending therefrom a vertical flange 46 adapted to lie inside of the door sill and against the vertical inside face thereof, as shown in Figure 5. The vertical and top edges of the door panel are provided with a marginal flange 48 which is adapted to embrace, as shown in Figures 1 and 3, the side edges and top edges of the combined side and top walls 16 and 18. It will thus be seen that when the lower flanged portion of the panel is inserted within the sill 20 and rested upon the top surface of the same, the panel may be swung inwardly to cause its marginal flange 48 to embrace and thus close the open door end of the housing.

In order to secure the panel in closed position, a hasp 50 is upstanding from the top wall of the housing, and an inwardly extending lug 52 is provided upon the top portion of the marginal flange 48, and has an elongated slot 54 therein for receiving the hasp 50. As will be apparent, any suitable fastener may be provided to lock or retain the hasp within the lug 52.

As shown in Figures 2, 6 and 8, the door panel 42 is provided with two or more substantially rectangular ventilating openings 56 which are provided with removable screens 58 to insure ventilation of the interior of the housing. Conveniently, as shown in Figure 6, the screens 58 may be mounted in suitable supporting frames 60 whereby they may be removably positioned and secured in the openings 56 in the door panel.

It will thus be seen that there is provided a device in which by means of the cushion 32 and the ventilation afforded by the screens 58, hygiene and comfort are provided during transportation. The device may be used as a pet house when transportation is not desired by merely removing the panel 42 and installing or leaving in place the wire frame 34 and the curtain 38, whereby the pet or animal may have easy access to the interior of the housing. The rigid door closure 42 may be at any time applied in order to confine the animal to the interior of the housing.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the invention as claimed.

What is claimed as new is as follows:

1. A portable pet house consisting of a housing having a floor, a rear end wall secured to said floor, a member forming side and top walls and secure to the sides of the floor and to the sides and top of the rear wall, said member and floor defining at the front of the housing an opening comprising a door therefor, a carrying handle secured to the top wall between the front and rear end thereof, supporting wheels mounted upon the underside of the floor at the rear thereof, supporting legs mounted upon the underside of the floor at the front thereof, a sill secured to and projecting above the floor and extending transversely of the housing across said opening at the front thereof, a door panel comprising a closure for said opening, said door panel comprising a unitary vertical sheet of material with a U-shaped marginal flange embracing the front end of the side and top wall and having at its lower end a horizontal flange extending transversely thereacross and resting upon the upper surface of said sill, said horizontal flange at its edge remote from the vertical sheet having a vertical depending flange disposed in side-by-side relation with the sill on the interior of the housing, said horizontal and vertical flanges being of less width than said opening at said sill whereby to enable ready passage therethrough, means operatively engaging the upper portions of the marginal rim and said top wall for detachably securing the panel to the housing in a position for closing said opening.

2. The combination of claim 1 including a cushioning pad of foam rubber in said housing resting upon the floor said pad engaging the depending flange of the door panel whereby to retain the same against said sill, the top surface of said pad lying below the top of the sill.

3. The combination of claim 1 wherein said vertical sheet is provided with a pair of ventilating openings therein, screws carried by said sheet and secured across said openings upon that surface of the sheet which is disposed inwardly of the housing.

4. The combination of claim 1 wherein said last mentioned means comprises a hasp mounted upon a rising above the top wall, said marginal flange having a member mounted thereon and projecting towards said hasp, said member being provided with a slot for receiving said hasp.

References Cited in the file of this patent

UNITED STATES PATENTS

| | | |
|---|---|---|
| 922,147 | Johnson | May 18, 1909 |
| 2,048,810 | Patche | July 28, 1936 |
| 2,538,778 | Halpin | Jan. 23, 1951 |
| 2,582,458 | Rose | Jan. 15, 1952 |